M. B. RICE.
CARBURETER.
APPLICATION FILED OCT. 25, 1910.
1,007,659.
Patented Oct. 31, 1911.
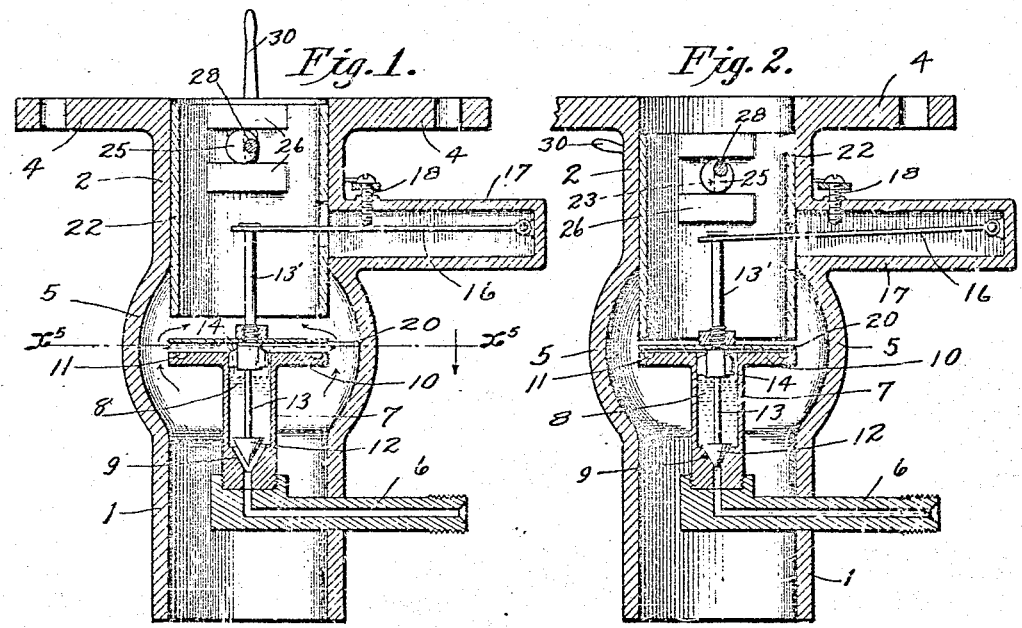
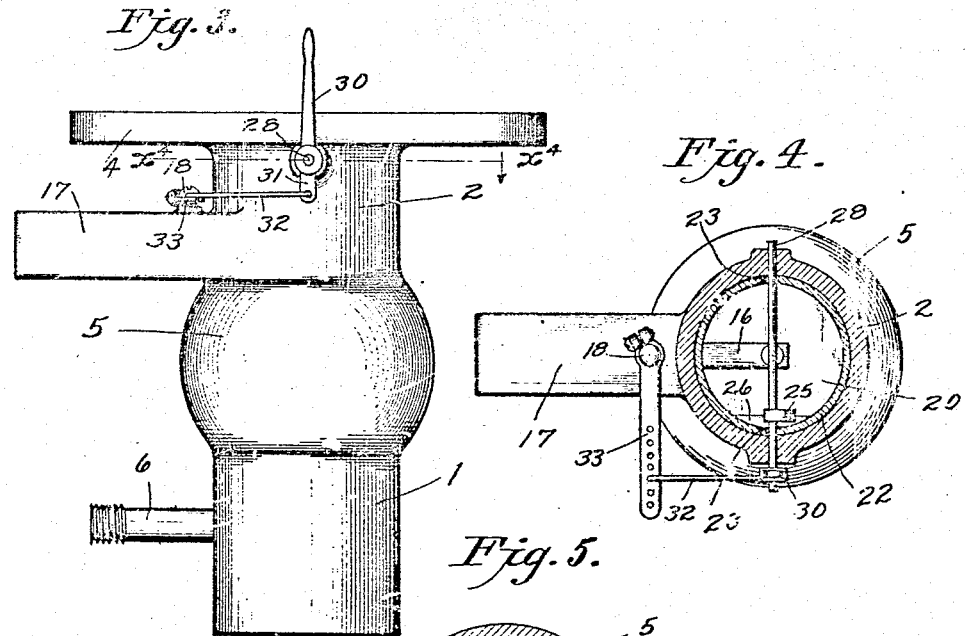
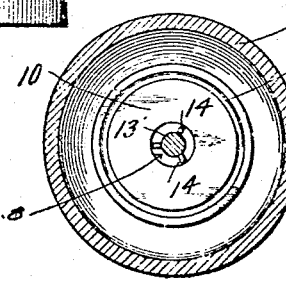
Witnesses:
J. D. Thornburgh.
O. H. Shelton.
Inventor:
Merrill B. Rice.
by Thurman Hawes Hackley
George H. Hackley
attys.

UNITED STATES PATENT OFFICE.

MERRILL B. RICE, OF LOS ANGELES, CALIFORNIA, ASSIGNOR OF ONE-HALF TO GEORGE MORGAN, OF LOS ANGELES, CALIFORNIA.

CARBURETER.

1,007,659.   Specification of Letters Patent.   Patented Oct. 31, 1911.

Application filed October 25, 1910. Serial No. 589,047.

*To all whom it may concern:*

Be it known that I, MERRILL B. RICE, a citizen of the United States, residing at Los Angeles, in the county of Los Angeles and State of California, have invented a new and useful Carbureter, of which the following is a specification.

The main object of the present invention is to provide a carbureter of simple construction which will produce a thorough and uniform mixture of the gasolene or oil with the air.

A further object of the invention is to provide a carbureter which will adapt itself automatically to rapid changes in the demand thereon.

Other objects of the invention will appear hereinafter.

The accompanying drawings illustrate the invention, and referring thereto: Figure 1 is a vertical section of the carbureter showing the operative or opening portion thereof. Fig. 2 is a similar view showing the throttle in closed position. Fig. 3 is a side elevation of the carbureter. Fig. 4 is a horizontal section on line $x^4$—$x^4$ in Fig. 3. Fig. 5 is a horizontal section on line $x^5$—$x^5$ in Fig. 1.

The carbureter comprises a casing formed with a cylindrical tubular lower portion constituting an inlet chamber which is open at its lower end to receive atmospheric air. A tubular cylindrical portion 2 constituting an outlet chamber and provided with means such as a flange 4 for attachment to an intake or manifold of an internal combustion engine, and an intermediate portion 5 formed as a swell or enlargement between the cylindrical portions 1 and 2. An oil supply pipe or duct 6 extends through one side of the inlet chamber 1 and a valve chamber 7 extends upwardly from this supply pipe, being provided with an inlet chamber or reservoir 8 and with a valve seat 9 at the lower end of said chamber 8 and communicating with the supply pipe 6. A spreader plate 10 on the upper end of the member 7 extends outwardly in the form of a disk and is preferably provided with an annular trough or depression 11 near its periphery.

A movable valve member 12 adapted to coöperate with the seat 9 is carried by a stem 13, guided by fins or ribs 14, sliding in the tubular member 8, said stem having an upward extension 13' attached to an arm 16 which may extend in a lateral extension 17 from the portion 2 of the carbureter casing. An adjusting screw 18, working in said casing extension 17 serves as a stop for the upward movement of said arm and of the valve member connected thereto. Said valve member carries a disk 20 extending from the stem portion 13' over the spreader plate 10, so as to confine the oil issuing from the chamber 8 to form a thin sheet of oil, which issues at the annular outlet formed between the spreader plate 10 and the disk 20.

A throttle member 22 is formed as a cylindrical tube sliding vertically within the casing portion 2, with its lower end extending into the expanded portion 5 of the casing and approaching more or less closely to the regulating disk 20, according to the adjustment of the throttle. The fixed and movable spreader members 10 and 20 extend transversely in the enlarged portion of the casing and are of about the same diameter as the outlet portion 2 of the casing and of the throttle member 22, said throttle member forming an outlet member for the mixture extending adjacent to the movable spreader to form an annular passage between said throttle member and the movable spreader member, the dimensions of this annular passage being adjusted or varied by movement of the throttle member longitudinally in the casing. Such adjustment of the throttle may be provided for by any suitable controlling means, for example, eccentric 25 engaging with a shoulder 26 on the throttle cylinder 22 and carried by a shaft 28, journaled in and extending through the walls of the casing and having an operating arm 30 thereon at the outside of the casing. The tubular throttle member 22 is slotted as at 23 for passage of shaft 28.

Means are provided for controlling the amount of gasolene admitted in correspondence with the amount of air admitted, such means providing for control of movement of the gasolene controlling valve 12 in correspondence with the movement of the throttle member 22. For this purpose an arm 31, connected to the throttle shaft 28 is connected by a rod 32 to an arm 33 secured to the screw 18, so that as the controlling arm 30 is operated to open the throttle by means of the eccentric 25, the rod 32 will turn the screw 18, so as to raise the same, allowing the arm 16 to ascend farther before it is stopped by said screw. The movable spreader plate or disk 20 is also controlled by the same operation.

The operation is as follows: The carbureter being connected to an internal combustion engine, each suction operation of the engine will draw air from the inlet through the throttle. In the closed or normal position shown in Fig. 2, the valve member 12 is against its seat 9, the spreader disk is close to the spreader plate 10, and the throttle cylinder 22 is nearer said spreader disk. When the throttle is raised, for example, to position shown in Fig. 1, and the suction is exerted therethrough as above stated, a condition of diminished pressure is brought upon the top of the spreader disk 20, and the said disk rises, opening the valve 9 and allowing gasolene to flow into the chamber 8, at the same time the suctional effect due to the rapid motion of the air into the throttle or outlet chamber and past the peripheries of the spreader members 10 and 20, tends to draw the gasolene from between said spreader members, said gasolene carried into and entrained with this current of air and passing into the throttle cylinder 22 and through the outlet of the carbureter. By reason of the uniform exposure of all parts of the annular outlet presented between the peripheries of the members 10 and 20, uniform mixture is secured and on account of the large circumferential dimension of the outlet, opportunity is given for complete mixture. It will be understood in the operation of the engine, the chamber 8 will become filled with gasolene and forms a reservoir upon which the engine can draw in starting up without depending on the restricted opening afforded by the supply pipe 6. The annular trough 11 near the periphery of the spreader plate 10 also provides a reserve supply capable of being taken up instantly in case of sudden increase in the demand on the engine. As the throttle is opened wider, admitting more air by increasing the space between the spreader member 20 and the throttle cylinder 22, it is desirable to also increase the amount of gasolene admitted. The upward movement of the valve 12 is limited by the screw 18, and as the throttle is opened the said screw is rotated as above described, so as to allow said spring to rise farther and the valve 12 and spreader disk 20 to rise in correspondence therewith, thereby providing for increased admission of oil and increased area of the outlet therefor between the members 10 and 20.

What I claim is:

1. A carbureter comprising a casing formed with inlet and outlet portions and with an intermediate enlargement, an oil supply connection extending into the casing and provided with a valve seat and with a fixed spreader member, said spreader member extending transversely within the said enlargement in the casing, a valve member coöperating with said valve seat, a movable spreader member connected to said valve member and extending parallel to and coöperating with said fixed spreader member to form an annular outlet between said members, and means extending from said outlet portion of the casing into proximity to the said movable spreader member to form an annular passage between said means and said movable spreader member, whereby the deficiency of pressure in the outlet portion of the casing as compared with the pressure in the inlet portion of the casing tends to move the movable spreader member to open the valve.

2. A carbureter comprising a casing having an inlet at the bottom and an outlet at its top, an oil supply connection extending into said casing, a fixed valve member formed with a valve seat communicating with said oil supply connection and with a horizontally extending spreader plate, a movable valve member coöperating with said valve seat, a movable spreader member connected with said movable valve member and extending over the aforesaid spreader plate to form in conjunction therewith, an annular oil outlet, a tubular throttle member slidably mounted in the upper portion of said casing and extending over said movable spreader member to form in conjunction therewith, an annular passage for the mixture, adjacent to the periphery of the movable spreader member, and yielding supporting means for said movable valve member to allow the same to be opened by the suction through the carbureter.

3. A carbureter comprising a casing formed with an inlet and an outlet, a throttle controlling the outflow of mixture from the casing, an oil supply connection extending to the casing and provided with a valve seat and with a spreader member, a valve member coöperating with said valve seat, a movable spreader member connected to said valve and coöperating with said fixed spreader member, to form an annular outlet between said members, and means for yieldingly supporting said valve member and movable spreader member to allow the same to be opened by the suction through the casing, means for limiting the opening movement of said movable valve member, means for operating the throttle and a connection from said throttle to said limiting means, to allow increased opening of the movable valve member in correspondence with increased opening of the throttle.

4. In a carbureter, a casing provided with an inlet and outlet portion, oil supply means extending thereinto, fixed spreader means connected to said oil supply means and extending transversely in the casing and formed with an annular outlet communicating with the oil supply means, a movable spreader member extending above said fixed spreader member and mounted to move to and from the fixed spreader member, and a throttle member slidably mounted in the outlet portion of the casing to move vertically to and from said movable spreader member and adjacent to the annular outlet forming an annular passage through which the air may be drawn past said annular outlet and into said tubular throttle member.

In testimony whereof, I have hereunto set my hand at Los Angeles, California this 17th day of October, 1910.

MERRILL B. RICE.

In presence of—
ARTHUR P. KNIGHT,
FRANK L. A. GRAHAM.